United States Patent [19]

McKinnon

[11] 3,839,141

[45] Oct. 1, 1974

[54] COATED GYPSUM BOARD

[75] Inventor: William L. McKinnon, Concord, Calif.

[73] Assignee: Kaiser Gypsum Company, Inc., Oakland, Calif.

[22] Filed: June 20, 1972

[21] Appl. No.: 264,464

[52] U.S. Cl............ 161/182, 117/155 VA, 117/158, 161/235, 161/250, 161/270
[51] Int. Cl...... B32b 3/22, C08h 13/00, D21h 5/00
[58] Field of Search............ 161/270, 182, 234, 235, 161/247, 250; 156/41–43; 117/158, 155 UA, 168

[56] References Cited
UNITED STATES PATENTS

| | | | |
|---|---|---|---|
| 2,877,196 | 3/1959 | Reding | 161/235 X |
| 3,417,040 | 12/1968 | Kremer | 161/235 X |
| 3,607,486 | 9/1971 | Jacks | 117/158 X |
| 3,629,171 | 12/1971 | Kremer | 161/235 X |

*Primary Examiner*—Marion E. McCamish
*Attorney, Agent, or Firm*—Schuyler, Birch, Swindler, McKie & Beckett

[57] ABSTRACT

A gypsum board against which concrete can be poured, and which will adhere to the concrete after it has set, is prepared by applying to the side of the board against which the concrete is to be placed, a mixture of water, wax emulsion, and vinyl polymer emulsion. The coating is conveniently applied during fabrication of the board, and can be dried when the board is dried.

12 Claims, No Drawings

COATED GYPSUM BOARD

BACKGROUND OF INVENTION

This invention concerns gypsum board, and particularly coated gypsum board.

Gypsum board is a well known building material which has been used for years, primarily as an interior wall and ceiling material, but also to a certain extent as an exterior material. Similarly, concrete is a well known structural material, used frequently in the load supporting parts of a building structure.

In the past, when it was desired to finish a concrete surface with gypsum board, it has been customary to first apply furring strips to the concrete, and then fasten gypsum board to the furring. There clearly would be savings in labor and material if it were possible to adhere the gypsum board directly to the concrete, particularly if it were possible to pour the concrete directly against the gypsum board, and have the board adhere to the concrete after it had set. It would then be possible to use the same gypsum board as a combination form material and finished surface. It will be understood, of course, that one side of the gypsum board, the back side, would be placed adjacent the concrete, and the other surface of the board, the front face, would form the finished surface.

Prior attempts to use conventional gypsum board in this fashion have disclosed several problems. First, the highly alkaline water from freshly poured concrete tends to soak into the gypsum board and damage it, so much so that the structural integrity of the gypsum board may be destroyed. Further, it is found that the board does not stick to the concrete after it has set, but rather readily parts from the concrete. Obviously, such a structure is of little use as an interior surface finish for a building.

It has been suggested to apply waterproofing materials, such as wax, to the back face of gypsum board to prevent entry of water from the concrete. However, it has been found that the wax does not perform its waterproofing function in the presence of alkaline water, and that penetration of the board occurs despite the wax coating. In addition, adherence between wax coated gypsum board and concrete is very poor.

It has also been suggested to apply a bonding material, for example an adhesive, to the board to improve adherence. However, again this has proved unsuccessful, both because the bonding material does not prevent penetration of water into the board, and also because the alkaline water tends to destroy the bonding effect of the adhesive.

In other words, prior attempts to apply either a waterproofing material or a bonding material separately to the gypsum board not only failed to solve the combination problem of bonding and waterproofing, but actually failed to perform the single function, either bonding or waterproofing, intended.

The present invention is directed to overcoming the foregoing problems.

SUMMARY OF THE INVENTION

It has now been found, according to this invention, that a gypsum board can be produced against which concrete can be cast, and which will resist penetration of water from the wet concrete, and which will adhere to the concrete after it has set, if the board has, on the surface against which the concrete is to be cast, a coating which is an intimate interdispersion of a wax and a vinyl polymer in the proportions of from 2 parts wax to 1 part polymer to 1 part wax to 4 parts polymer, all parts being by weight. Such coating is applied to the gypsum board as a water emulsion of wax and vinyl polymer, the emulsion containing from 1.5 parts to 5 parts by weight water for each part by weight of wax and polymer.

DETAILED DESCRIPTION

The gypsum board used in the practice of this invention may be a standard type of board with a gypsum core and adhering front and back paper facing sheets, made in the conventional manner. Alternatively, other known types of gypsum board, for example a waterproof board containing oil or tar and a wax emulsion in the core, as disclosed in U.S. Pat. No. 2,604,411, can be used.

The wax emulsion used in the practice of this invention can readily be obtained as a commercial product. Typical examples of such commercially available wax emulsions are: Hercules Paracol 447-K and 404-G paraffin wax/rosin emulsion containing 42–55 percent solids, Farbest Waxit-Y-50, a paraffin emulsion, Diamond Shamrock fire retardant KG, a chlorinated paraffin, and Poldicure wax.

The vinyl polymer emulsion used may be any such material but polyvinyl acetate (PVA) is a preferred material. Again, such materials are readily available on the market, for example under the following trade names: Reichhold 40 polyvinyl acetate, Air Products & Chemicals ethylene vinyl acetate 510, Borden PVA emulsion 2123, and Casco 577. It will be understood that other, equivalent materials, for example latexes such as Dow Latex 630 a styrene-butadiene copolymer latex binder, B. F. Goodrich Hycar Nitrile Latex No. 1571 an acrylonitrile rubber latex, and Ucar Latex No. 153, an acrylate ester acrylic latex, can be used in place of the vinyl polymer. It has been found that better results are obtained with a PVA emulsion which is relatively fresh, e.g., less than 6 months old.

The finished coating on the gypsum board is an intimate interdispersion of wax and vinyl polymer in proportions, by weight, ranging from 2 parts wax to 1 part polymer to 1 part wax to 4 parts polymer. A preferred coating contains about 1 part wax to 1.2 parts polymer.

The coating is most conveniently applied to gypsum board by admixing a commercially available wax emulsion and a polyvinyl acetate emulsion with sufficient water to produce an admixture of desired viscosity. It has been found that for each part by weight of wax and polymer, on the solids basis, the admixture should contain from about 1.5 to 5 parts water. With less than this amount of water, the admixture becomes unduly viscous and difficult to apply. With larger amounts of water, the admixture is too diluted and it becomes difficult to apply the desired amount of the solid materials to the board. A preferred admixture contains about 2.5 parts water for each part by weight of wax and polymer.

It will be understood that, in practicing this invention, it may be more convenient to measure the water, wax emulsion and polyvinyl acetate emulsion by volume, rather than on the basis of weight. It will be apparent to those skilled in the art that, given a wax emulsion containing a specified weight percent of wax, and a polyvinyl acetate emulsion containing a specified weight percent of PVA, it is a simple matter of arithmetic to calculate the volumes of these two emulsions which must be mixed with a certain volume of water to obtain the desired weight proportions of the materials. For example, in a preferred form of this invention, the admixture to be applied to the gypsum board is made by combining 1 part by volume of a polyvinyl acetate emulsion containing about 55 percent by weight solids with 1 part by volume of a wax emulsion containing about 45 percent by weight solids, and 1.5 parts by volume water. This produces an admixture having the preferred weight proportions specified above, and when dried produces a coating having the preferred weight proportions of the solid components.

The emulsion admixture can be applied to a finished board, but it will generally be found more economic, particularly in large-scale production, to apply the admixture to the back surface of the board during the manufacture of the board, after the board has been shaped and before it passes into the drier. Thus, the coating and the board can be dried at the same time.

The emulsion admixture can be applied by spraying, brushing, rolling, but a preferred method of applying, particularly useful on a continuous production line, is by flowing it onto the board as a continuous curtain of liquid falling from a slit aperture in the bottom of a reservoir placed over the board forming line. The emulsion admixture is applied to the gypsum board at a rate such that one gallon of the admixture covers from 750 to 1000 square feet of board.

In using gypsum board coated according to the present invention, the board may be placed inside regular concrete forms with the front or finished face of the board against the form and the back or coated face facing inwardly, so the concrete is cast against the coated face of the gypsum board. It is also possible, when using special high strength gypsum boards, for the gypsum board to replace the form board, for example plywood, provided sufficient external support is provided the gypsum board.

Before casting concrete against the coated boards, it is preferred that the joints between boards be filled with mortar, much as is done in finishing wallboard joints in the interior of a structure. However, it is not necessary to use paper strips or other reinforcement in the joints.

Example

The following coating admixture was made: 0.5 part by volume Borden 2123 polyvinyl acetate emulsion, 1.0 part by volume Hercules Paracol 447-K wax emulsion, and 1.5 parts by volume water. One gallon of this admixture was applied to 800 square feet of one-half inch wallboard on a regular production line just prior to passing the board into the drier.

The board thus coated was subjected to several tests: a modified Cobb test for water penetration, a shear test to determine adherence between the coated board and cast concrete, a blocking test to determine whether coated boards tend to stick together during storage, and an aging test to see if the coating retained its efficacy after storage.

In the modified Cobb test, a steel ring of 100 cm² inside area and about 5 cm height is clamped onto the coated surface of the board, and 100 cc of a 10 percent by weight Portland cement slurry in water at 70°F, and having a pH about 11, is poured into the ring and left for 16 hours. At the end of this time, the water remaining in the ring is poured out and any excess blotted off the board. By weighing the board before and after this test, it was found that 1.9 grams of water had been absorbed by the coated board of the above Example during the 16 hours.

By way of comparison, a regular uncoated gypsum board subjected to the same test absorbs between 90 and 100 percent of the water. It has been found by other, similar tests, that absorptions of less than 3 grams during this test are characteristic of a gypsum board with a satisfactory coating.

In the shear test, concrete is cast on the back, coated surface of the board to a depth of about three-fourth inch and in such a configuration that a portion of the concrete extends beyond one edge of the test section of board. After the concrete has set, a block of wood is glued to the front face of the test specimen, one portion of the board extending over the edge of the test section of board opposite to the extension of the concrete. Force is then applied in a Dillon tester to the extended portions of concrete and wood, so as to apply a shear stress to the joint between the concrete and the coated gypsum board.

The coated gypsum board made in the above example, and subjected to this test, failed at a stress of 60 pounds per square inch of contact area between the board and the concrete. In fact, however, failure occurred not between the concrete and the board, but rather internally within the gypsum itself. In other words, adherence between the concrete and coated board is greater than the internal strength of gypsum board itself.

In the blocking test, two coated board specimens approximately 5 inches square are placed with their coated faces together in a Dillon tester under 300 pounds total load for 1 hour. Upon removal from the tester, it was possible to separate two specimens made as in the example with light hand effort. Another test for blocking was conducted by storing full sized 4 × 8 feet specimens of coated board in various configurations, coated faces together and coated face against uncoated face, under the weight of 15 sheets of board for 5½ months. After this time, there was no difficulty in separating the various sheets one from the other.

In the aging test, coated gypsum board made according to the example was stored for 5½ months, and then subjected to the shear test. Again, failure occurred in the board itself, and not in the bond between the concrete and the board.

By way of comparison, gypsum boards coated solely with the wax emulsion used in the preceding example showed erratic results in the modified Cobb test using the alkaline solution of cement, the absorption of water during the test being as much as 22.7 g. In addition, a coating of wax alone is soft and does not stand up well during handling of the board, and of course gives no bond to poured and set concrete.

By way of further comparison, gypsum board was coated with polyvinyl acetate emulsion without wax addition and subjected to the preceding tests. It was found that the PVA film did not seal the board against penetration of water and did not provide any bonding between the board and the concrete. Examination of the PVA coating showed it was not a continuous film.

However, examination of the combination coating according to this invention shows it to be a continuous film. In other words, wax and polyvinyl acetate emulsions in combination interact to form a continuous film which provides both sealing and bonding for the gypsum board.

Having now described the invention, what is claimed is:

1. In a gypsum board having a gypsum core, a first paper facing sheet, and a second paper facing sheet, each adhered to said core, the improvement comprising an alkaline water penetration resistant coating on the exterior surface of at least one of said sheets, said coating being capable of adhering to concrete cast in communication with said gypsum board, and being an intimate interdispersion of a wax and vinyl polymer capable of forming an aqueous emulsion in the proportions of from 2 parts wax to 1 part polymer to 1 part wax to 4 parts polymer, all parts being by weight.

2. Gypsum board according to claim 1 wherein said interdispersion contains about 1 part wax to 1.2 parts polymer.

3. Gypsum board according to claim 1 wherein said polymer is polyvinyl acetate.

4. Gypsum board according to claim 1 wherein said wax and said polymer have been applied to the board in the form of an admixture of water emulsions of the wax and the polymer.

5. Gypsum board according to claim 4 wherein said admixture of water emulsions contains from 1.5 parts to 5 parts by weight water for each part of wax and polymer.

6. Wallboard according to claim 5 wherein said polymer is polyvinyl acetate.

7. A structure comprising a gypsum board according to claim 6 and a slab of set concrete adhered to the coated facing of said board.

8. Wallboard according to claim 6 wherein said admixture of water emulsions contains about 1 part wax, about 1.2 parts polyvinyl acetate, and about 5.5 parts water, by weight.

9. A structure comprising a gypsum board according to claim 8 and a slab of set concrete adhered to the coated facing of said board.

10. Wallboard according to claim 8 wherein said admixture of water emulsions is formed by combining 1 part by volume of a polyvinyl acetate emulsion containing about 55 percent by weight solids, 1 part by volume of a wax emulsion containing about 45 percent by weight solids, and 1.5 parts by volume water.

11. A structure comprising a gypsum board according to claim 10 and a slab of set concrete adhered to the coated facing of said board.

12. A structure comprising a gypsum board according to claim 1 and a slab of set concrete adhered to the coated facing of said board.

* * * * *